United States Patent [19]

Harrison, Jr.

[11] 3,851,235

[45] Nov. 26, 1974

[54] BRIDGE CIRCUIT FOR CONTROLLING A DIRECT CURRENT MOTOR

[75] Inventor: Clarence E. Harrison, Jr., Madison Heights, Mich.

[73] Assignee: Ford Motor Company, Dearborn, Mich.

[22] Filed: Dec. 26, 1973

[21] Appl. No.: 428,526

[52] U.S. Cl. ............................. 318/257, 318/345
[51] Int. Cl. ............................................ H02p 5/16
[58] Field of Search .......... 318/138, 256, 257, 341, 318/342, 345

[56] References Cited
UNITED STATES PATENTS

| | | | |
|---|---|---|---|
| 3,371,259 | 2/1968 | James et al. | 318/345 X |
| 3,441,828 | 4/1969 | Henry | 318/345 |
| 3,477,004 | 11/1969 | Westbrook | 318/257 |
| 3,480,849 | 11/1969 | Thornsen et al. | 318/257 |
| 3,731,170 | 5/1973 | Emmert | 318/257 |

*Primary Examiner*—Robert K. Schaefer
*Assistant Examiner*—W. E. Duncanson, Jr.
*Attorney, Agent, or Firm*—Robert W. Brown; Keith L. Zerschling

[57] ABSTRACT

A bridge circuit for controlling a direct current motor permits the direction of rotation of the motor to be reversed while permitting the motor speed and its torque or current-level to be separately and independently controlled for each direction of motor rotation. The bridge circuit includes first and second transistors connected in adjacent legs of the bridge circuit and, respectively, first and second circuit means coupled to the first and second transistors for controlling the magnitude of voltage applied to these transistors. The other legs of the bridge circuit include third and fourth transistors. Third and fourth circuit means are coupled, respectively, to the third and fourth transistors for limiting the current which can flow through the third and fourth transistors to respective maximum values. First switching means are provided for controlling the simultaneous application of a control voltage to the first and fourth circuit means, and second switching circuit means are provided for controlling the simultaneous application of a control voltage to the first and fourth circuit means. The winding of the direct current motor is connected across opposite terminals of the bridge circuit.

9 Claims, 1 Drawing Figure

PATENTED NOV 26 1974
3,851,235
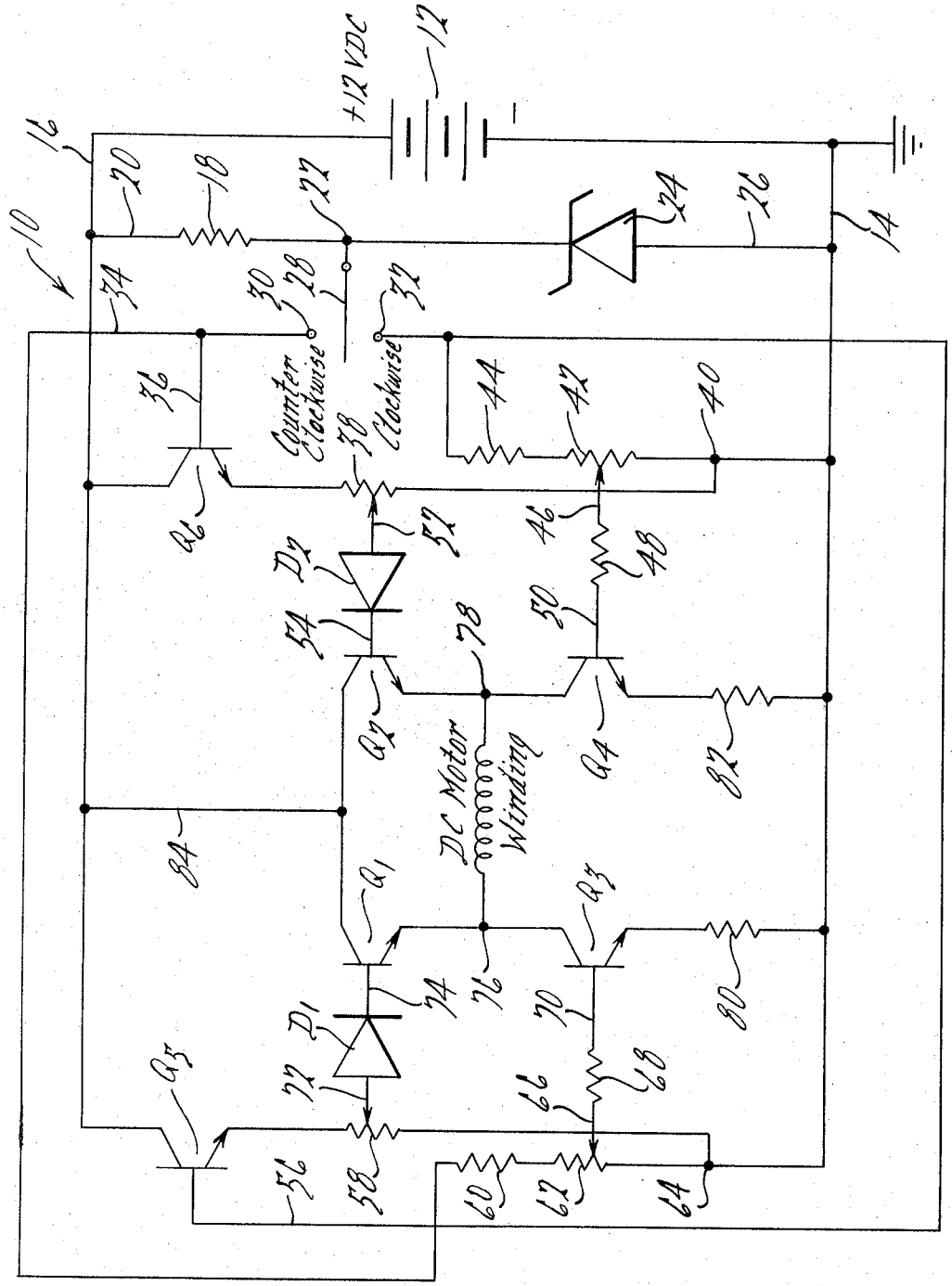

3,851,235

BRIDGE CIRCUIT FOR CONTROLLING A DIRECT CURRENT MOTOR

BACKGROUND OF THE INVENTION

This invention relates to a bridge circuit for the control of a direct current motor. More particularly, the invention relates to a bridge circuit which permits the direction of rotation of a direct motor current motor to be reversed and which permits the applied voltage and maximum current in the motor winding for one direction of motor rotation to be controlled independently and separately from the control of the voltage and maximum current for the other direction of rotation of the motor.

Bridge circuits for controlling the direct current motors to permit them to be reversed, that is, to rotate in either of two directions, are known in the prior art. Typically, a supply voltage is applied across first and third opposite terminals of a bridge circuit, and the winding of the direct current motor is connected across second and fourth opposite terminals of the bridge circuit. Transistors in opposite legs of the bridge circuit are simultaneously rendered conductive in their output circuits to cause current to flow through the motor winding in a first direction to produce motor rotation, and transistors in the other opposite legs of the bridge circuit are simultaneously rendered conductive in their output circuits to cause current to flow through the motor winding in the opposite direction to produce rotation of the motor in the opposite direction. Issued U.S. patents which describe bridge circuits for controlling a direct current motor include Heider et al., U.S. Pat. No. 3,496,441; Iondanidis, Pat. No. 3,535,883; Prapis et al., Pat. No. 3,388,307 and Livengood et al., Pat. No. 3,332,007.

SUMMARY OF THE INVENTION

It is an object of the present invention to provide a control circuit for a direct current motor.

Another object of the invention is to provide such a control circuit which permits the direction of rotation of the motor to be reversed and which permits separate and independent control of the voltage applied to the motor winding or armature and the current allowed to flow through the motor winding or armature for each direction of rotation of the motor. The applied voltage determines the motor speed and the limitation of the motor current to a maximum value limits the stall torque of the motor.

A further object of the invention is to provide a control circuit for a direct current motor which minimizes the sensitivity of the control circuit and motor to variations in the voltage of the source of electrical potential supplying the motor and control circuit.

A still further object of the invention is to provide a motor control circuit which permits variable motor speed control and variable motor current or stall torque limitation for each direction of motor rotation.

These and other objects of the invention may be better understood by reference to the detailed description which follows and to the drawing which is a schematic diagram of a control circuit for a direct current motor.

DETAILED DESCRIPTION OF THE INVENTION

With reference now to the drawing, there is shown a DC motor winding connected in a bridge circuit generally designated by the numeral 10. The circuit includes a DC source of electrical energy 12. The circuit 10 is particularly suitable for use in a motor vehicle and, thus, the source of electrical energy 12 may have a nominal 12-volt DC terminal voltage. The negative terminal of the source 12 is connected to a ground lead 14 and its positive terminal is connected to a voltage supply lead 16.

A resistor 18 has its terminal 20 connected to the voltage supply lead 16 and has its other terminal connected at a junction 22 to the cathode of a zener diode 24, the anode of which is connected by a lead 26 to the ground lead 14. The zener diode 24 may have a reverse breakdown voltage of, for example, 10 volts.

The junction 22 is connected to a switch 28 having the neutral position shown in the drawing. The switch 28 may be placed in positions wherein it forms electrical contact with either of its poles 30 or 32. When the switch 28 is in contact with the pole 30, the motor winding rotates the motor in a counterclockwise direction whereas, when the switch 28 is in contact with the pole 32, the motor turns in a clockwise direction. The pole 30 is connected to the base or control electrode 36 of a transistor $Q_6$ and is connected by a lead 34 to the upper terminal of a resistor 60. The resistor 60 is connected in series with a potentiometer resistor 62 which has one of its terminals connected to the ground lead 14. Similarly, the pole 32 of the switch 28 is connected by a lead 56 to the base or control electrode of a transistor $Q_5$ and is connected to a resistor 44. The resistor 44 is connected in series with a potentiometer resistor 42 which has one of its terminals connected to the ground lead 14. The first terminal of the bridge circuit is formed by a lead 84 that is connected to the junction formed between the collectors of a transistor $Q_1$ and a transistor $Q_2$. The second terminal 76 of the bridge circuit is connected to the emitter of the transistor $Q_1$. The collector-emitter circuit of transistor $Q_1$ comprises its output circuit and the base 74 of this transistor is its control electrode. The ground lead 14 forms the third terminal of the bridge circuit, and the output circuit of a transistor $Q_3$, the output circuit comprising its collector-emitter circuit, is connected through a resistor 80, preferably one ohm, to the third or ground lead terminal 14. The base or control electrode 7 of the transistor $Q_3$ is connected through a current-limiting resistor 68 to the movable arm 66 of the potentiometer 62. Similarly, the output circuit comprising the collectr-emitter circuit of a transistor $Q_4$ is connected between the third terminal or ground lead 14 of the bridge circuit and the fourth terminal 78 of the bridge circuit. The emitter of the transistor $Q_4$ is connected through a resistor 82, preferably 1 ohm, to the ground lead 14. The base or control electrode 50 of this transistor is connected through a current-limiting resistor 48 to the movable arm 46 of the potentiometer 42.

The output circuit, comprising the collector and emitter of the transistor $Q_2$, is connected between the first terminal 84 and the fourth terminal 78 of the bridge circuit. The base or control electrode 54 of the transistor $Q_2$ is connected to the cathode of a diode $D_2$ the anode of which is connected to the movable arm 52 of a potentiometer 38. The potentiometer resistor is connected between the emitter of the transistor $Q_6$ and the junction 40 connected to the ground lead 14. Similarly, the base or control electrode 74 of the transistor $Q_1$ is connected to the cathode of a diode $D_1$ the anode of which is connected to the movable arm 72 of a potentiometer 58. The resistor of the potentiometer 58 is connected between the emitter of the transistor $Q_5$ and the junction 64 connected to the ground lead 14.

By way of example, and not limitation, the various components of the circuit 10 may have the following values or be of the following types:

| | |
|---|---|
| Transistors $Q_1$, $Q_2$, $Q_3$ and $Q_4$ | MJE-1101 |
| Transistors $Q_5$ and $Q_6$ | 2N2925 |
| Diodes $D_1$ and $D_2$ | 1N4001 |
| Zener Diode 24 | 1N4740A |
| Resistors 80 and 82 | one ohm |
| Resistors 48 and 68 | 47 ohms |
| Resistors 44 and 60 | 2.3 kilohms |
| Resistance of potentiometers 38, 42, 58, and 62 | one kilohm |

In the operation of the circuit 10, let it be assumed that the switch 28 is placed in contact with its pole 32, thereby, to apply the regulated 10-volt zener voltage at the junction 22 to the base or control electrode of the transistor $Q_5$ and simultaneously to the potentiometer 42 through the series-connected resistor 44. The switch 28 and the transistor $Q_5$ comprise switch means for controlling the application of a control voltage to the potentiometer 58. When the regulated voltage is applied to the base of the transistor $Q_5$ this transistor, connected as an emitter follower, is rendered conductive to produce a regulated voltage at the upper terminal of the potentiometer 58. With 10 volts applied to the base of the transistor $Q_5$, the voltage on the potentiometer 58 will be about 9.3 volts due to the base-emitter drop of the transistor $Q_5$. The arm 72 of the potentiometer 58 is set to apply a predetermined voltage, which may be varied as a function of the potentiometer setting, to the anode of the diode $D_1$. The diode $D_1$ is forward-biased and produces a voltage drop of about 0.7 volt. Thus, the regulated voltage on the arm 72 of the potentiometer 58, less about 0.7 volt, is applied to the base or control electrode 74 of the transistor $Q_1$.

With the regulated voltage applied at the control electrode 74, the base-emitter junction of the transistor $Q_1$ is forward-biased to render this switching transistor conductive in its output circuit. The voltage at the second terminal 76 of the bridge circuit will be equal to the voltage at the control electrode 74 less the base-emitter drop of the transistor $Q_1$. Thus, the voltage at the second terminal 76 of the bridge circuit is variable as determined by the setting of the potentiometer arm 72 and is regulated by the action of the zener diode 24. This regulated and variable voltage at the bridge circuit second terminal 76 is applied to the motor winding and determines its speed of rotation in one direction.

The switch 28 comprises switching means for applying the zener voltage, at the junction 22, to the potentiometer 42 through resistor 44, connected in series with the potentiometer resistor, this being simultaneous with the application of the zener voltage to the control electrode 56 of the transistor $Q_5$ as was previously described. The resistor 44 and potentiometer 42 resistance values are chosen, preferably, such that the voltage at the upper terminal of the potentiometer 42 is about 3.0 volts. Thus, the arm 46 of the potentiometer 42 when moved to its maximum voltage position cannot rise above 3.0 volts.

The resistor 44, the potentiometer 42, the current-limiting resistor 48 and the resistor 82, connected in series with the output circuit of the transistor $Q_4$ comprise circuit means for limiting the current which can flow through the transistor $Q_4$ output circuit to a maximum value determined by the setting of the potentiometer arm 46. The circuit including the potentiometer 58 and its movable arm 72 comprises means for controlling the magnitude of voltage applied to the control electrode 74 of the first transistor $Q_1$, which, in turn, controls the magnitude of the voltage applied at the second terminal 76 of the bridge circuit and which, therefore, determines the voltage applied across the motor winding and its speed. Thus, the motor speed may be varied by movement of the potentiometer arm 72.

When the transistor $Q_1$ is conductive to apply a regulated voltage to the terminal 76 of the motor winding, the transistor $Q_4$ also is conductive due to the bias voltage applied across its base-emitter junction through the potentiometer arm 46 and current-limiting resistor 48. Current then flows through the output circuit of the transistor $Q_1$, through the motor winding, through the output circuit of the transistor $Q_4$ and through the resistor 82 to the ground lead 14. The motor then rotates in a clockwise direction.

As the load on the motor increases, the current flowing through the motor winding and through the output circuit of the transistor $Q_4$ increases proportionately. The increase in current through the output circuit of the transistor $Q_4$ flows through the resistor 82 and the greater this current, the greater is the voltage drop across the resistor 82. The voltage at the base or control electrode 50 of the transistor $Q_4$ cannot rise above a predetermined value nearly equal to the voltage setting of the movable arm 46 of the potentiometer 42. Thus, if the current flowing through the output circuit of the transistor $Q_4$ rises above a maximum level, the voltage across the resistor 82 increases to the point where the voltage across the base-emitter junction of the transistor $Q_4$ will have decreased below the voltage required to maintain the transistor $Q_4$ fully conductive in its output circuit. This limits the motor current to a maximum value, which also corresponds to a stall torque limitation for the motor.

When the current flowing through the output circuit of the transistor $Q_4$ has reached its limiting value, the voltage occurring at the emitter of the transistor $Q_4$, due to the current flowing through the resistor 82, may have reached a fairly high level. This voltage level would during motor stall torque conditions be reflected through the motor winding to the emitter of the transistor $Q_1$. The diode $D_1$ prevents this or other reverse-bias voltages from breaking down the emitter-to-base junction of the transistor $Q_1$, which, for example, could occur if the movable arm 72 of the potentiometer 58 were set near its low voltage limit when the movable arm 46 of the potentiometer 42 is set at a high voltage position.

When the switch 28 is in contact with its pole 30, the zener voltage at the junction 22 simultaneously is applied to the control electrode 36 of the transistor $Q_6$ and to the potentiometer 62 through the series-connected resistor 60. The transistor $Q_6$ functions in the manner described for the transistor $Q_5$ to apply a regulated voltage to the potentiometer 38 which, in turn, applies a regulated voltage to the control electrode 54 of the transistor $Q_2$ to render it conductive. The transistor $Q_3$ is also conductive at this time. Current then flows through the output circuit of the transistor $Q_2$, through the motor winding, through the output circuit of the transistor $Q_3$, and through the resistor 80 to the ground lead 14. Since the current flowing through the motor winding is opposite in direction to the current flowing through it when the switch 28 is in contact with its pole 32, it is apparent that the motor thus may be made to rotate in an opposite direction. Also, it may be seen that the setting of the respective potentiometer arms 52 and 72 determine, respectively, the voltages applied to the motor winding and, thus, the speed of the motor, for each direction of motor rotation. Therefore, when the switch 28 is in contact with its pole 30, the motor may rotate at a speed different than the speed of its rotation when the switch 28 is in contact with its pole 32. Moreover, the potentiometer arms 46 and 66 may have different motor current and stall torque limitations for the opposite directions of motor rotation. Motor speed and torque limitation is separate and independent for each direction of motor rotation.

Based upon the foregoing description of the invention, what is claimed is:

1. A bridge circuit for the control of a direct current motor, said bridge circuit having first, second, third and fourth terminals, said first and third terminals being voltage supply terminals for connection to a direct current source of electrical energy and said motor having a winding connecting across said second and fourth terminals, said bridge circuit comprising:
   a. a first transistor having a control electrode and an output circuit, said first transistor output circuit being connected between said first and second terminals;
   b. a second transistor having a control electrode and an output circuit, said second transistor output circuit being connected between said first and fourth terminals;
   c. a third transistor having a control electrode and an output circuit, said third transistor output circuit being coupled to said second and third terminals;
   d. a fourth transistor having a control electrode and an output circuit, said fourth transistor output circuit being coupled to said third and fourth terminals;
   e. first circuit means for controlling the magnitude of voltage to be applied to said first transistor control electrode and to be applied at said second terminal;
   f. second circuit means for controlling the magnitude of voltage to be applied to said second transistor control electrode and to be applied at said fourth terminal;
   g. third circuit means for limiting the current which can flow through said third transistor output circuit to a maximum value, said third circuit means being coupled to said third transistor control electrode;
   h. fourth circuit means for limiting the current which can flow through said fourth transistor output circuit to a maximum value, said fourth circuit means being coupled to said fourth transistor control electrode;
   i. first switching circuit means for controlling the simultaneous application of a control voltage to said first and fourth circuit means; and
   j. second switching circuit means for controlling the simultaneous application of a control voltage to said second and third circuit means;
   whereby the direction of the current flowing through said motor winding may be controlled, the voltage applied across said motor winding may be controlled to control motor speed and the current flowing through said motor winding may be limited to a maximum value.

2. A bridge circuit for the control of a direct current motor in accordance with claim 1 wherein said first circuit means comprises a potentiometer having a movable arm coupled to said control electrode of said first transistor and wherein said second circuit means comprises a potentiometer having a movable arm coupled to said control electrode of said second transistor.

3. A bridge circuit for the control of a direct current motor in accordance with claim 1 wherein said third circuit means comprises a potentiometer having a movable arm coupled to said control electrode of said third transistor, wherein said output circuit of said third transistor is coupled to said bridge circuit third terminal through a first resistor, wherein said fourth circuit means comprises a potentiometer having a movable arm, coupled to said control electrode of said fourth transistor, and wherein said output circuit of said fourth transistor is coupled to said bridge circuit third terminal through a second resistor.

4. A bridge circuit for the control of a direct current motor in accordance with claim 3 wherein said first circuit means comprises a potentiometer having a movable arm coupled to said control electrode of said first transducer and wherein said second circuit means comprises a potentiometer having a movable arm coupled to said control electrode of said second transistor.

5. A bridge circuit in accordance with claim 1 wherein said third circuit means comprises means for generating a predetermined voltage coupled to said control electrode of said third transistor, wherein said third transistor output circuit is coupled through a first resistor to said bridge circuit third terminal, wherein said fourth circuit means comprises means for generating a predetermined reference voltage coupled to said control electrode of said fourth transistor, and wherein said fourth transistor output circuit is coupled through a second resistor to said bridge circuit third terminal.

6. A bridge circuit for the control of a direct current motor in accordance with claim 1 wherein said first circuit means is coupled to said control electrode of said first transistor through a first diode and wherein said second circuit means is coupled to said control electrode of said second transistor through a second diode.

7. A bridge circuit for the control of a direct current motor in accordance with claim 2 wherein said first means is coupled to said control electrode of said first transistor through a first diode and wherein said second circuit means is coupled to said control electrode of said second transistor through a second diode.

8. A bridge circuit for the control of a direct current motor in accordance with claim 3 wherein said first means is coupled to said control electrode of said first transistor through a first diode and wherein said second circuit means is coupled to said control electrode of said second transistor through a second diode.

9. A bridge circuit for the control of a direct current motor in accordance with claim 4 wherein said first means is coupled to said control electrode of said first transistor through a first diode and wherein said second circuit means is coupled to said control electrode of said second transistor through a second diode.

* * * * *